US012012642B2

(12) United States Patent
Lister et al.

(10) Patent No.: US 12,012,642 B2
(45) Date of Patent: Jun. 18, 2024

(54) METHODS OF SELECTIVELY RECOVERING PALLADIUM FROM A PALLADIUM-CONTAINING MATERIAL

(71) Applicant: Battelle Energy Alliance, LLC, Idaho Falls, ID (US)

(72) Inventors: Tedd E. Lister, Bangor, ME (US); Luis A. Diaz Aldana, Idaho Falls, ID (US)

(73) Assignee: Battelle Energy Alliance, LLC

( * ) Notice: Subject to any disclaimer, the term of this patent is extended or adjusted under 35 U.S.C. 154(b) by 1269 days.

(21) Appl. No.: 16/541,930

(22) Filed: Aug. 15, 2019

(65) Prior Publication Data
US 2021/0047708 A1   Feb. 18, 2021

(51) Int. Cl.
*C22B 11/00* (2006.01)
*C22B 3/10* (2006.01)

(52) U.S. Cl.
CPC ............... *C22B 11/04* (2013.01); *C22B 3/10* (2013.01)

(58) Field of Classification Search
CPC .................... C22B 3/10; C22B 11/04
See application file for complete search history.

(56) References Cited

U.S. PATENT DOCUMENTS

| 9,039,806 | B2 | 5/2015 | Dreisinger et al. |
| 9,649,712 | B2 | 5/2017 | Chen et al. |
| 9,777,346 | B2 | 10/2017 | Lister et al. |
| 2007/0230484 | A1 | 10/2007 | Hu et al. |
| 2014/0307281 | A1 | 10/2014 | Park |
| 2017/0067135 | A1* | 3/2017 | Lister .............. C25C 1/06 |
| 2017/0306440 | A1* | 10/2017 | Hein ............... C22B 3/12 |
| 2018/0351765 | A1 | 12/2018 | Aarey Premanath et al. |

FOREIGN PATENT DOCUMENTS

| CN | 109680154 A | * | 4/2019 | |
| EP | 2254279 A2 | | 11/2010 | |
| WO | 2011/156861 A1 | | 12/2011 | |
| WO | WO-2016063187 A1 | * | 4/2016 | ...... C22B 1/00 |

OTHER PUBLICATIONS

Behnamfard et al., "Process Development for Recovery of Copper and Precious Metals from Waste Printed Circuit Boards With Emphasize on Palladium and Gold Leaching and Precipitation, Waste Management," vol. 33, (2013), pp. 2354-2363.
Harjanto et al., "Leaching of Pt, Pd and Rh from Automotive Catalyst Residue in Various Chloride Based Solutions," Materials Transactions, vol. 47, No. 1, (2006), pp. 129-135.
International Search Report from International Application No. PCT/US2020/016645, dated May 4, 2020, 5 pages.
International Written Opinion from International Application No. PCT/US2020/016645, dated May 4, 2020, 9 pages.

* cited by examiner

*Primary Examiner* — Sally A Merkling
*Assistant Examiner* — Ricardo D Morales
(74) *Attorney, Agent, or Firm* — TraskBritt

(57) ABSTRACT

A method of selectively recovering palladium from a palladium-containing material comprises providing a leaching solution comprising hydrochloric acid, hydrogen peroxide, and an iron salt comprising one or both of ferric chloride or ferrous chloride and contacting a palladium-containing material with the leaching solution to dissolve palladium from the palladium-containing material. Related methods of selectively recovering palladium from a palladium-containing material are also disclosed.

15 Claims, 2 Drawing Sheets

METHODS OF SELECTIVELY RECOVERING PALLADIUM FROM A PALLADIUM-CONTAINING MATERIAL

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to methods of selectively recovering palladium from a palladium-containing material. More particularly, embodiments of the disclosure relate to methods of recovering palladium from a palladium-containing material, such as used in catalytic converter materials or in electronic waste, with a leaching solution including an acid, an oxidizer, and ferric ions.

BACKGROUND

Palladium is a precious metal exhibiting useful properties suitable for a wide range of applications. For example, palladium is used as a catalyst material in industrial processes such as hydrogenation and dehydrogenation reactions. Palladium is also used in catalytic converters to reduce emissions of carbon monoxide, $NO_x$ gases, and hydrocarbons from automobiles. Other uses of palladium include electronic devices (computers, cell phones, etc.), which may incorporate palladium, such as in ceramic capacitors or other electronic components of the electronic devices.

Unfortunately, natural resource deposits of palladium are limited. In view of the limited supply of palladium, several have attempted to recover palladium from industrial sources such as from used catalytic converters, waste electronics, or other materials that may include even trace amounts of palladium. Methods of recycling palladium include hydrometallurgical processes that include leaching palladium from a palladium-containing material. Some materials that include palladium (e.g., catalytic converters, electronic waste) also include other materials from which it is also desirable to separate the palladium. For example, in addition to the palladium, catalytic converters may include rhodium, platinum, and other metals. Electronic waste may include additional metals, such as copper, tin, zinc, silver, gold, and platinum, among others. It is often desirable to selectively recover palladium from palladium-containing materials. However, several chemistries and processes to recover such metals suffer from a lack of selective removal of the metals contained therein.

BRIEF SUMMARY

In accordance with one embodiment described herein, methods of selectively recovering palladium from a palladium-containing material are disclosed. For example, in some embodiments, a method of selectively recovering palladium from a palladium-containing material comprises providing a leaching solution comprising hydrochloric acid, hydrogen peroxide, and an iron salt comprising one or both of ferric chloride or ferrous chloride, and contacting a palladium-containing material with the leaching solution to dissolve palladium from the palladium-containing material.

In additional embodiments, a method of recovering palladium from a palladium-containing material comprises providing, to a palladium leaching vessel, a leaching solution comprising an acid, an oxidizer, and ferric ions, and contacting a palladium-containing material with the leaching solution to selectively dissolve palladium from the palladium-containing material and form a solution comprising dissolved palladium.

In yet additional embodiments, a method of selectively recovering palladium from a palladium-containing material comprises contacting, at a temperature less than about 25°, 25° C. a palladium-containing material with a leaching solution to form a solution comprising dissolved palladium. The leaching solution comprises from about 1.0 M to about 2.0 M hydrochloric acid, from about 1.0 weight percent to about 10.0 weight percent hydrogen peroxide, and from about 5 mM ferrous chloride to about 10 mM ferrous chloride. The method further comprises removing the dissolved palladium from the solution comprising dissolved palladium.

DETAILED DESCRIPTION

Figure 1:
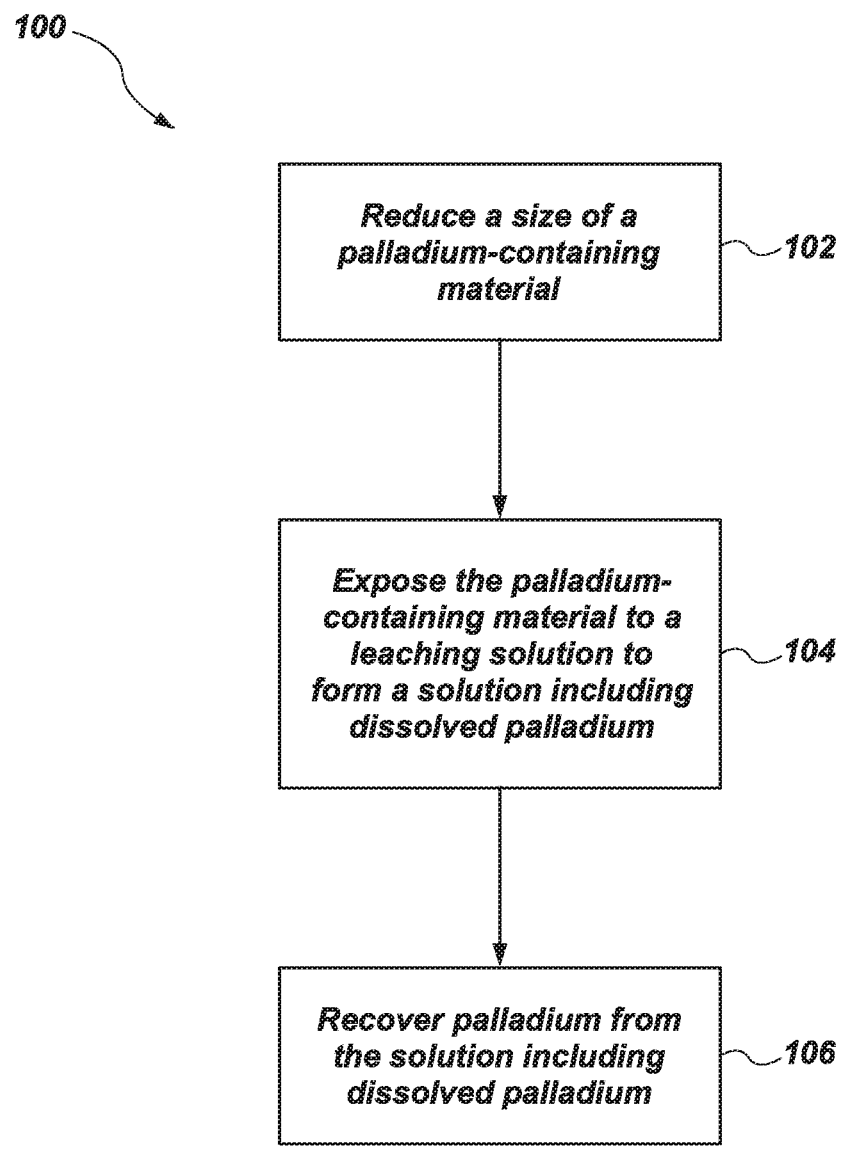
FIG. 1 is a simplified flow-chart illustrating a method of recovering palladium from a palladium-containing material, in accordance with embodiments of the disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, or system for recovering palladium from a palladium-containing material. Only those process acts and structures necessary to understand the embodiments of the disclosure are described in detail below. Additional acts to remove selectively palladium from a palladium-containing material may be performed by conventional techniques. Also note, any drawings accompanying the present application are for illustrative purposes only, and are thus not drawn to scale. Additionally, elements common between figures may retain the same numerical designation.

As used herein, the term "iron ions" means and includes one or both of ferric ($Fe^{3+}$) ions and ferrous ($Fe^{2+}$) ions. Ferrous ions may be oxidized in the presence of an oxidizer (e.g., hydrogen peroxide) to form ferric ions.

According to embodiments described herein, a method of recovering palladium from a palladium-containing material includes exposing the palladium-containing material to a leaching solution including an acid, an oxidizer, and iron ions (e.g., ferric ions ($Fe^{3+}$), ferrous ions ($Fe^{2+}$)) dissolved therein. The acid may include a source of halide ions. For example, the acid may include one or more of hydrochloric acid, hydrofluoric acid, hydrobromic acid, or hydroiodic acid. The oxidizer may include one or more of hydrogen peroxide, chlorite ions, chlorate ions, perchlorate ions, or hypochlorite ions. In some embodiments, the oxidizer comprises hydrogen peroxide. The iron ions may be provided by dissolving one or more iron salts (e.g., ferric chloride or ferrous chloride) in the leaching solution comprising the acid and the oxidizer. The palladium-containing material may be exposed to the leaching solution to leach palladium from the palladium-containing material and dissolve the palladium in the leaching solution to form a solution comprising dissolved palladium. The palladium may be recovered from the solution comprising dissolved palladium by, for example, exposing the solution including the dissolved palladium to one or more materials (e.g., zinc, aluminum, tin, etc.) formulated and configured to precipitate the dissolved palladium.

The leaching solution comprising the acid, the oxidizer, and the iron (e.g., ferric) ions may exhibit a synergistic effect and exhibit an improved palladium leaching rate compared to other leaching solutions not including all three components. For example, a leaching solution including hydrochloric acid, hydrogen peroxide, and ferric chloride may exhibit an improved palladium leaching rate compared to leaching solutions including only hydrochloric acid and hydrogen peroxide. In addition, the leaching solution including the acid, the oxidizer, and the ferric ions may leach palladium at temperatures lower than temperatures required to leach palladium in many conventional processes. Further, the leaching solution described herein may selectively leach palladium without substantially leaching other precious metals, such as platinum.

FIG. 1 is a simplified flow-chart illustrating a method 100 of recovering palladium from a palladium-containing material. The palladium-containing material may include catalytic converters, used hydrogenation catalysts, used dehydrogenation catalysts, other catalysts including palladium, electronic waste, palladium-containing ores, or other palladium-containing materials.

The method 100 may include act 102 including reducing a size of a palladium-containing material; act 104 including exposing the palladium-containing material to a leaching solution formulated and configured to dissolve the palladium to form a solution including dissolved palladium; and act 106 including recovering palladium from the solution including the dissolved palladium.

Act 102 may include reducing a size of the palladium-containing material. For example, the palladium-containing material may be one or more of crushed, ground into a powder, pelletized, or shredded. Reducing a size of the palladium-containing material may increase an exposed surface area of the palladium-containing material.

The palladium-containing material may include a catalytic converter, used electronics (electronic waste, also referred to as e-waste), used catalyst materials comprising palladium, or other material including palladium therein. In some embodiments, the palladium-containing material includes additional metals, such as platinum, rhodium, rhenium, or other precious metals. In some embodiments, the palladium-containing material includes palladium and at least platinum.

In some embodiments, act 102 includes milling (e.g., ball milling) the palladium-containing material to form a powder of the palladium-containing material having a particle size below about 1 mm. In some embodiments, the palladium-containing material is milled to a powder having a size between about 0.1 mm and about 1.0 mm, such as between about 0.1 mm and about 0.5 mm or between about 0.5 mm and about 1.0 mm, although the size of the powder is not so limited. The powder may have the same material composition as the source of the palladium-containing material, but may have a relatively smaller size.

Act 104 may include exposing the palladium-containing material to a leaching solution formulated and configured to dissolve the palladium to form a solution including dissolved palladium. The leaching solution may include an acid, an oxidizer, and iron ions. In some embodiments, the leaching solution may be prepared by mixing, with the acid having the desired concentration, a desired amount of the oxidizer and a source of the iron ions in the acid.

The acid may include a material comprising at least one halide, such as one or more of chlorine atoms, fluorine atoms, bromine atoms, or iodine atoms. By way of nonlimiting example, the acid may include one or more of hydrochloric acid, hydrofluoric acid, hydrobromic acid, or hydroiodic acid. In some embodiments, the acid comprises hydrochloric acid.

The acid may have a concentration within a range from about 0.01 Molar (M) to about 10.0 M, such as from about 0.01 M to about 0.10 M, from about 0.10 M to about 0.50 M, from about 0.50 M to about 1.0 M, from about 1.0 M to about 2.0 M, from about 2.0 M to about 4.0 M, from about 4.0 M to about 6.0 M, from about 6.0 M to about 8.0 M, or from about 8.0 M to about 10.0 M. In some embodiments, the concentration of the acid in the leaching solution is about within a range of from about 1.0 M to about 3.0 M, such as about 2.0 M. The weight percent of the acid in the leaching solution may be within a range from about 0.03 weight percent to about 35.0 weight percent, such as from about 0.03 weight percent to about 0.10 weight percent, from about 0.10 weight percent to about 0.25 weight percent, from about 0.25 weight percent to about 0.50 weight percent, from about 0.50 weight percent to about 1.0 weight percent, from about 1.0 weight percent to about 3.0 weight percent, from about 3.0 weight percent to about 5.0 weight percent, from about 5.0 weight percent to about 10.0 weight percent, from about 10.0 weight percent to about 20.0 weight percent, or from about 20.0 weight percent to about 35.0 weight percent. In some embodiments, the weight percent of the acid in the leaching solution is within a range of from about 5.0 weight percent to about 10.0 weight percent.

The oxidizer may include one or more of hydrogen peroxide ($H_2O_2$), chlorate salts ($ClO_3^-$), chlorite salts ($ClO_2^-$), hypochlorite salts ($ClO^-$), or perchlorate salts ($ClO_4^-$). The oxidizer may be provided as a salt, such as, for example, one or more of sodium chlorate ($NaClO_3$), sodium chlorite ($NaClO_2$), sodium perchlorate ($NaClO_4$), sodium peroxide ($NaO_2$), potassium chlorate ($KClO_3$), potassium peroxide ($K_2O_2$), potassium perchlorate ($KClO_4$), calcium chlorate ($CaClO_3$), calcium hypochlorite ($Ca(OCl)_2$), magnesium peroxide ($MgO_2$), ammonium perchlorate ($NH_4ClO_4$), or ammonium permanganate ($NH_4MnO_4$). In some embodiments, the oxidizer comprises hydrogen peroxide. However, the disclosure is not so limited and the oxidizer may include other materials.

The oxidizer may be present in the leaching solution within a range of from about 0.1 weight percent to about 30.0 weight percent, such as from about 0.1 weight percent to about 0.5 weight percent, from about 0.5 weight percent to about 1.0 weight percent, from about 1.0 weight percent to about 2.0 weight percent, from about 2.0 weight percent to about 4.0 weight percent, from about 4.0 weight percent to about 6.0 weight percent, from about 6.0 weight percent to about 8.0 weight percent, from about 8.0 weight percent to about 10.0 weight percent, from about 10.0 weight percent to about 15.0 weight percent, from about 15.0 weight percent to about 20.0 weight percent, from about 20.0 weight percent to about 25.0 weight percent, or from about 25.0 weight percent to about 30.0 weight percent. In some embodiments, the oxidizer is present in the leaching solution at a weight percent within a range of from about 1.0 weight percent to about 10.0 weight percent, such as about 5.0 weight percent.

The leaching solution may further include ions or iron (e.g., ferric ions ($Fe^{3+}$), ferrous ions ($Fe^{2+}$), or both) dissolved therein. The iron ions may be provided to the leaching solution as an iron salt, such as one or more of ferric chloride ($FeCl_3$), ferrous chloride ($FeCl_2$), iron bromide ($FeBr_2$, $FeBr_3$), iron fluoride ($FeF_2$, $FeF_3$), ferrous iodide ($FeI_2$, $FeI_3$), iron molybdate ($FeMoO_4$, $Fe_2(MoO_4)_3$), iron oxalate ($FeC_2O_4$, $Fe_2(C2O_4)_3$), iron perchlorate ($Fe(ClO_4)_2$, $Fe(ClO_4)_3$), iron sulfate ($Fe_2(SO_4)_3$, $FeSO_4$), or another iron-containing salt. In some embodiments, the leaching solution includes one or both of ferrous chloride or ferric chloride.

In some embodiments, the iron salt may be provided in the form of ferrous ions. In some such embodiments, the ferrous ions may be oxidized in the presence of the oxidizing agent (e.g., hydrogen peroxide) since the oxidizing agent may exhibit a higher oxidation power than the ferrous ions. In other words, the oxidizing agent may shift the redox potential above that of ferrous chloride and oxidize the ferrous ions to ferric ions. Accordingly, even when the iron ions are provided in the form of ferrous ions, the ferrous ions may be oxidized to ferric ions in the presence of the oxidizing agent.

A concentration of the iron ions in the leaching solution may be within a range from about 0.1 millimolar (mM) to about 4.0 M, such as from about 0.1 mM to about 0.5 mM, from about 0.5 mM to about 1 mM, from about 1 mM to about 5 mM, from about 5 mM to about 10 mM, from about 10 mM to about 20 mM, from about 20 mM to about 30 mM, from about 30 mM to about 40 mM, from about 40 mM to about 50 mM, from about 50 mM to about 0.1 M, from about 0.1 M to about 0.5 M, from about 0.5 M to about 1.0 M. from about 1.0 M to about 2.0 M, from about 2.0 M to about 3.0 M, or from about 3.0 M to about 4.0 M. In some embodiments, the concentration of the iron ions in the leaching solution is within a range from about 1 mM to about 50 mM, such as from about 1.0 mM to about 20.0 mM. In some embodiments, the concentration of the iron ions in the leaching solution is about 10 mM. A weight percent of the iron ions (not including the counter ion of the iron salt) in leaching solution may be within a range of from about 0.0007 weight percent to about 7.0 weight percent, such as from about 0.0007 weight percent to about 0.001 weight percent, from about 0.001 weight percent to about 0.002 weight percent, from about 0.002 weight percent to about 0.004 weight percent, from about 0.004 weight percent to about 0.006 weight percent, from about 0.006 weight percent to about 0.008 weight percent, from about 0.008 weight percent to about 0.010 weight percent, from about 0.010 weight percent to about 0.020 weight percent, from about 0.020 weight percent to about 0.050 weight percent, from about 0.050 weight percent to about 0.10 weight percent, from about 0.10 weight percent to about 0.20 weight percent, from about 0.20 weight percent to about 0.30 weight percent, from about 0.30 weight percent to about 0.50 weight percent, from about 0.50 weight percent to about 1.0 weight percent, from about 1.0 weight percent to about 2.0 weight percent, from about 2.0 weight percent to about 4.0 weight percent, or from about 4.0 weight percent to about 7.0 weight percent. In some embodiments, the weight percent of the iron ions in the leaching solution is within a range of from about 0.01 weight percent to about 0.20 weight percent, such as from about 0.01 weight percent to about 0.05 weight percent, from about 0.05 weight percent to about 0.10 weight percent, from about 0.10 weight percent to about 0.15 weight percent, or from about 0.15 weight percent to about 0.20 weight percent. Although specific concentrations of the iron (e.g., ferric) ions have been described, the disclosure is not so limited and the solution may include higher or lower concentrations of the iron ions than those described. In some embodiments, the leaching solution comprises less of the iron salt by weight than the oxidizer. As used herein, a weight percent of iron ions in the leaching solution means and includes a weight percent of ferric ions, a weight percent of ferrous ions, or a combined weight percent of ferric ions and ferrous ions in the leaching solution. In some embodiments, ferrous ions in the leaching solution including the oxidizer are oxidized to ferric ions. In some such embodiments, even if the iron salt is provided in the form of a ferrous salt, the ferrous ions are oxidized to ferric ions in the leaching solution.

In some embodiments, for every 1.0 M of acid in the solution, the solution may include the iron ions within a range of from about 0.001 M (1.0 mM) and about 1.0 M, such as from about 1.0 mM to about 2.0 mM, from about 2.0 mM to about 5.0 mM, from about 5.0 mM to about 10.0 mM, from about 10.0 mM to about 25.0 mM, from about 25.0 mM to about 50.0 mM, from about 50.0 mM to about 0.10 M, from about 0.10 M to about 0.25 M, from about 0.25 M to about 0.50 M, from about 0.50 M to about 0.75 M, or from about 0.75 M to about 1.0 M. In other words, a molar ratio of the iron ions to the acid may be within a range of from about 0.001:1.0 to about 1.0:1.0. In some embodiments, for every about 1.0 M of acid in the solution, the leaching solution may include iron ions within a range from about 5.0 mM to about 50 mM iron ions, such as from about 5.0 mM to about 10 mM, from about 10 mM to about 20 mM, from about 20 mM to about 30 mM, from about 30 mM to about 40 mM, or from about 40 mM to about 50 mM iron ions.

A ratio by weight percent of the iron ions to the acid within the solution may be within a range of from about 1.0:0.01 to about 1.0:50,000, such as from about 1.0:0.01 to about 1.0:0.5, from about 1.0:0.5 to about 1.0:1.0, from about 1.0:1.0 to about 1.0:10, from about 1.0:10 to about 1.0:50, from about 1.0:50 to about 1.0:100, from about 1.0:100 to about 1.0:500, from about 1.0:500 to about 1.0:1,000, from about 1.0:1,000 to about 1.0:5,000, from about 1.0:5,000 to about 1.0:10,000, from about 1.0:10,000 to about 1.0:20,000, or from about 1.0:20,000 to about 1.0:50,000. In some embodiments, the ratio by weight percent of the iron ions to the acid is within a range of from about 1.0:100 to about 1.0:200, such as about 1.0:125. In some such embodiments, the leaching solution may include about 1.0 part ferric ions for between about every 100 parts and about 200 parts of the acid.

A ratio by weight percent of the iron ions (e.g., ferric ions) to the oxidizer within the solution may be within a range of from about 1.0:0.15 to about 1.0:45,000, such as from about 1.0:0.15 to about 1.0:0.15, from about 1.0:0.15 to about 1.0:0.50, from about 1.0:0.50 to about 1.0:1.0, from about 1.0:1.0 to about 1.0:5.0, from about 1.0:5.0 to about 1.0:10.0, from about 1.0:10.0 to about 1.0:20.0, from about 1.0:20.0 to about 1.0:40:0, from about 1.0:40.0 to about 1.0:60.0, from about 1.0:60.0 to about 1.0:80.0, from about 1.0:80.0 to about 1.0:100, from about 1.0:100 to about 1.0:150, from about 1.0:150 to about 1.0:200, from about 1.0:200 to about 1.0:500, from about 1.0:500 to about 1.0:1.000, from about 1.0:1,000 to about 1.0:5,000, from about 1.0:5,000 to about 1.0:10,000, from about 1.0:10,000 to about 1.0:20,000, from about 1.0:20,000 to about 1.0:30,000, or from about 1.0:30,000 to about 1.0:45,000. In some embodiments, the ratio by weight percent of the iron ions to the oxidizer is within a range of from about 1.0:25.0 to about 1.0:250, such as from about 1:25.0 to about 1:50.0, from about 1.0:50.0 to about 1.0:100, from about 1.0:100 to about 1.0:150, from about 1.0:150 to about 1.0:200, or from about 1.0:200 to about 1.0:250.

In other words, for every about 1.0 part by weight of the iron ions, the solution may include within a range of about 0.015 part by weight and about 45,000 parts by weight of oxidizer (e.g., $H_2O_2$), such as, for example, from about 50.0 to about 250 parts by weight oxidizer. In some embodiments, for every part by weight or iron ions, the leaching solution comprises between about 80 parts and about 90 parts by weight of hydrogen peroxide.

Referring again to FIG. 1, act 106 includes recovering palladium from the solution including the dissolved palladium. In some embodiments, the solution including the dissolved palladium therein may be stored and the palladium may be recovered as the solution including dissolved palladium therein.

In other embodiments, the solution including the dissolved palladium therein may be contacting with one or more palladium precipitating agents. By way of nonlimiting example, the solution including the dissolved palladium may be exposed to one or more of zinc, aluminum, or tin to precipitate the dissolved palladium and form a solution substantially free of palladium. The one or more of the zinc, aluminum, or tin may be added to the solution including dissolved palladium as a powder. For example, palladium chloride may be precipitated according to Equation (1) below:

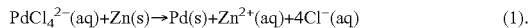

$$PdCl_4^{2-}(aq)+Zn(s)\rightarrow Pd(s)+Zn^{2+}(aq)+4Cl^-(aq) \quad (1).$$

Similar reactions between palladium chloride and tin or aluminum may be used to precipitate the palladium from the solution including dissolved palladium therein. In some embodiments, the palladium may be recovered as a solid.

Without being bound by any particular theory, it is believed that exposing the palladium-containing material to the leaching solution including the acid, the oxidizer, and the iron ions increases the dissolution of palladium from the palladium-containing material. It is believed that the combination of the acid, the oxidizer, and the iron ions exhibit a synergistic effect on the dissolution of palladium from the palladium-containing material. In addition, the leaching solution including the acid, oxidizer, and iron ions may not substantially dissolve other metals that may be present in the palladium-containing material. In other words, the leaching solution may selectively leach palladium from the palladium-containing material. For example, the solution may not substantially dissolve platinum, ruthenium, or rhodium. Further, the leaching solution may leach palladium from the palladium-containing material at temperatures lower than about 100° C., such as lower than about 90° C., lower than about 80° C., lower than about 70° C., lower than about 60° C., lower than about 50° C., lower than about 40° C., lower than about 30° C., lower than about 25° C., or even lower than about 20° C. Since the palladium is leached from the palladium-containing material at relatively low temperatures (compared to temperatures as high as about 80° C. or as high as about 100° C. used in conventional leaching processes), the hydrogen peroxide may not decompose to water and oxygen. By way of comparison, at elevated temperatures (e.g., temperatures greater than about 60° C.), the palladium may act as a catalyst in the decomposition of hydrogen peroxide to water and oxygen. Accordingly, in at least some embodiments, the leaching solution may be formulated and configured to selectively leach palladium from a palladium-containing material at temperatures lower than about 60° C., such as lower than about 25° C.

Figure 2:
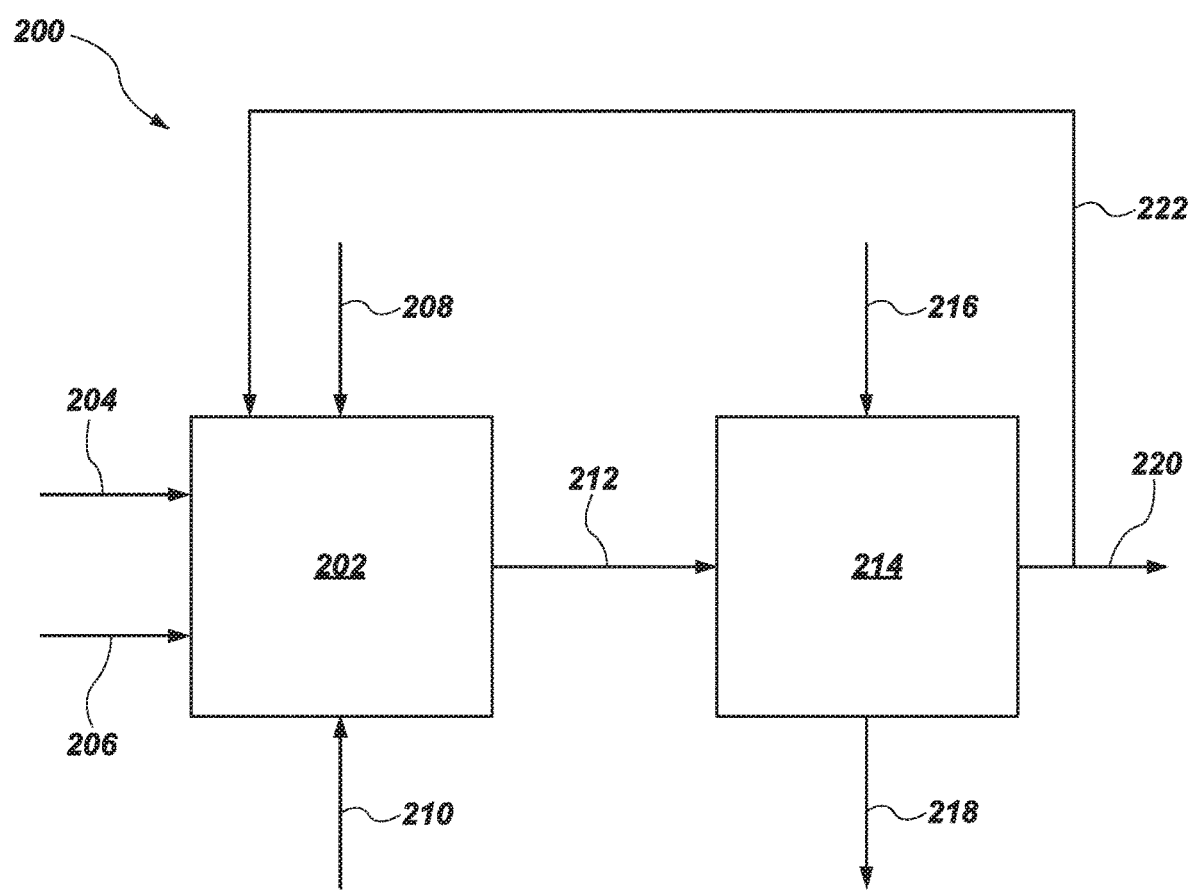
FIG. 2 is a simplified schematic illustrating a system for recovering palladium from a palladium-containing material, in accordance with embodiments of the disclosure.

FIG. 2 is a simplified schematic illustrating a system 200 for recovering palladium from a palladium-containing material. The system 200 may include a leaching vessel 202 including the leaching solution described above. The leaching vessel 202 may be in communication with a palladium-containing material 204, which may include any of the materials described above.

The leaching solution may include an acid 206, an oxidizer 208, and an iron salt 210, such as a source of iron (e.g., ferric) ions. The acid 206, the oxidizer 208, and the iron salt 210 may include any of the respective materials described above with reference to FIG. 1. Accordingly, the leaching solution may be formed in the leaching vessel 202 by providing each of the acid 206, the oxidizer 208, and the iron salt 210 individually to the leaching vessel 202. In some embodiments, the acid 206 is provided to the leaching vessel 202. After the acid 206 is added to the leaching vessel 202, the oxidizer 208 and the iron salt 210 are added to the leaching vessel 202. In some embodiments, the leaching vessel 202 includes the palladium-containing material 204. In other embodiments, the palladium-containing material 204 is added to the leaching vessel 202 after forming the leaching solution.

The leaching solution and the leaching vessel 202 may be maintained at a temperature within a range from about 15° C. to about 100° C., such as from about 15° C. to about 20° C., from about 20° C. to about 25° C., from about 25° C. to about 30° C., from about 30° C. to about 40° C., from about 40° C. to about 50° C., from about 50° C. to about 60° C., from about 60° C. to about 70° C., from about 70° C. to about 80° C., from about 80° C. to about 90° C., or from about 90° C. to about 100° C. In some embodiments, the temperature of the leaching solution and the leaching vessel 202 is maintained at about room temperature, such as from about 18° C. to about 25° C. or from about 20° C. to about 25° C. In some embodiments, the temperature of the leaching solution and the leaching vessel 202 is about 21° C.

The leaching solution may contact the palladium-containing material 204 in the leaching vessel 202 for a duration within a range from about 15 minutes to about 120 minutes, such as from about 15 minutes to about 30 minutes, from about 30 minutes to about 45 minutes, from about 45 minutes to about 60 minutes, from about 60 minutes to about 75 minutes, from about 75 minutes to about 90 minutes, from about 90 minutes to about 105 minutes, or from about 105 minutes to about 120 minutes. In some embodiments, the leaching solution contacts the palladium-containing material 204 for less than about 60 minutes, such as than about 45 minutes or less than about 30 minutes.

Although FIG. 2 has been described and illustrated as including forming the leaching solution in the leaching vessel 202 and provided various components of the leaching solution (e.g., the acid 206, the oxidizer 208, and the iron salt 210) to the leaching vessel 202, the disclosure is not so limited. In other embodiments, the leaching solution is formed external to the leaching vessel 202 and provided to the leaching vessel 202 having the desired composition (e.g., the acid 206, the oxidizer 208, and the iron salt 210).

With continued reference to FIG. 2, the leaching vessel 202 may be in fluid communication with a palladium recovery vessel 214. After the leaching solution is mixed with the palladium-containing material 204 in the leaching vessel 202, dissolved palladium may be removed from the leaching vessel 202 in a palladium-containing solution 212 (a solution including dissolved palladium). In some embodiments, the palladium-containing solution 212 comprises a palladium-chlorine complex, such as tetrachloropalladate ($PdCl_4^{2-}$). However, the disclosure is not so limited and the palladium-containing solution 212 may include other forms of dissolved palladium or palladium complexes.

The palladium recovery vessel 214 may be in fluid communication with the palladium-containing solution 212. A palladium precipitating agent 216 may be added to the palladium recovery vessel 214. The palladium precipitating agent 216 may be formulated and configured to react with dissolved palladium in the palladium-containing solution 212 and form a palladium precipitate 218. In some embodiments, the palladium precipitating agent 216 comprises one or more of zinc, tin, or aluminum.

The palladium precipitate 218 may comprise a palladium-containing solid and may be removed from the palladium recovery vessel 214. A solution 220 having palladium removed therefrom may exit the palladium recovery vessel 214. In some embodiments, a portion of the solution 220 may be recycled in a recycle stream 222 and recycled back to the leaching vessel 202. In some embodiments, at least a portion of the solution 220 may be treated to remove, for example, remaining portions of the palladium precipitating agent 216 therefrom.

In some embodiments, the palladium-containing material may include electronic waste that has been at least partially processed to remove at least a portion of metals contained therein. For example, at least a portion of base metals (e.g., zinc, tin, lead, nickel, and copper) may be removed from the electronic waste by methods such as those described in U.S. Pat. No. 9,777,346, issued Oct. 3, 2017 and titled "Methods for Recovering Metals from Electronic Waste, and Related Systems," the entire disclosure of which is incorporated herein in its entirety by this reference.

Precious metals, such as silver and gold may be removed from the electronic waste, as described in U.S. Pat. No. 9,777,346. After removing the silver and gold from the electronic waste, palladium may be recovered from the electronic waste by the methods described herein.

EXAMPLE

A palladium-containing material was exposed to various solutions including various combinations of an acid, an oxidizer, and an iron salt. The acid included hydrochloric acid having a strength of about 2 M. The oxidizer included 5 weight percent hydrogen peroxide. The iron salt included ferrous chloride or ferric chloride. The conditions (temperature, duration, leaching solution composition) for several experiments are reproduced in Table I below. In Experiments 1-3 and 5-9, a 1 cm×1 cm foil comprising palladium was placed in contact with the leaching solution. In Experiment 4, partially processed electronic waste was placed in contact with the leaching solution. The leaching solution was stirred during exposure of the foils to the leaching solution. No chlorine gas was observed during any of the Experiments.

TABLE I

| Exp. | Leaching Solution | Temp (° C.) | Time (min) | Weight Loss (mg/cm$^2$) | Corrosion Depth (μm) | Corrosion Rate (μm/hr) | Leach Rate (mg/cm$^2$/hr) |
|---|---|---|---|---|---|---|---|
| 1 | 2M HCl + 5% H$_2$O$_2$ (7.2 wt % HCl + 5 wt % H$_2$O$_2$) | 80 | 60 | 0.0024 | 2.037 | 2.037 | 0.0407 |
| 2 | 2M HCl + 5% H$_2$O$_2$ (7.2 wt % HCl + 5 wt % H$_2$O$_2$) | 60 | 60 | 0.0017 | 1.424 | 1.424 | 0.0285 |
| 3 | 2M HCl + 5% H$_2$O$_2$ (7.2 wt % HCl + 5 wt % H$_2$O$_2$) | 21 | 60 | 0.0000 | −0.023 | −0.023 | −0.0005 |
| 4 | 2M HCl + 5% H$_2$O$_2$ (7.2 wt % HCl + 5 wt % H$_2$O$_2$) with electronic waste | 60 | 80 | 0.0111 | 9.213 | 6.910 | 0.1382 |
| 5 | 2M HCl + 5% H$_2$O$_2$ + 10 mM FeCl$_2$ (7.2 wt % HCl + 5 wt % H$_2$O$_2$ + 0.13 wt % FeCl$_2$) | 60 | 35 | 0.0107 | 8.912 | 15.278 | 0.3056 |
| 6 | 2M HCl + 5% H$_2$O$_2$ + 10 mM FeCl$_2$ (7.2 wt % HCl + 5 wt % H$_2$O$_2$ + 0.13 wt % FeCl$_2$) | 21 | 75 | 0.0128 | 10.706 | 8.922 | 0.1784 |
| 7 | 2M HCl + 10 mM FeCl$_3$ (7.2 wt % HCl + 0.16 wt % FeCl$_3$) | 21 | 60 | 0.0009 | 0.729 | 0.729 | 0.0146 |
| 8 | 2M HCl + 1.6% H$_2$O$_2$ + 10 mM FeCl$_2$ (7.2 wt % HCl + 1.6 wt % H$_2$O$_2$ + 0.13 wt % FeCl$_2$) | 21 | 66 | 0.0072 | 6.019 | 5.471 | 0.1094 |
| 9 | 2M HCl + 5% H$_2$O$_2$ + 10 mM FeCl$_2$ + 10 mM KBr (7.2 wt % HCl + 5 wt % H$_2$O$_2$ + 0.13 wt % FeCl$_2$ + 0.12 wt % KBr) | 21 | 60 | 0.0045 | 3.785 | 3.785 | 0.0757 |

In Table I, the weight loss refers to the difference in weight in the palladium-containing material before and after the palladium-containing material was exposed to the leaching solution. The corrosion depth refers to a reduction in dimension (thickness) of the palladium-containing material after exposure to the leaching solution while the corrosion rate refers to the reduction in dimension (thickness) of the palladium-containing material after exposure to the leaching solution per unit of time. The leach rate refers to the rate at which palladium was leached (dissolved) from the palladium-containing material per surface area per unit of time of exposure of the palladium-containing material to the leaching solution.

Referring to Table I, there appears to be a synergistic effect of a leaching solution including all three of hydrochloric acid, hydrogen peroxide, and ferrous chloride. Referring to Experiment 1 and Experiment 2, when the leaching solution did not include ferrous chloride and included only hydrochloric acid and hydrogen peroxide, there was minor leaching of palladium from the palladium-containing material when the leaching solution was maintained at a temperature of about 80° C. and 60° C., respectively. Referring to Experiment 3, when the temperature of the same leaching solution was dropped to about 21° C., there was substantially no leaching of the palladium from the palladium-containing material.

In Experiment 4, electronic waste was exposed to the same leaching solution as Experiment 2. A significant portion of the processed electronic waste was leached with the leaching solution. It is believed that the electronic waste included residual iron left from extraction of gold of the electronic waste using thiourea.

In Experiment 5, 10 mM $FeCl_2$ was added to the leaching solution of Experiment 2. The addition of $FeCl_2$ to the leaching solution significantly improved the leaching rate of palladium from the palladium-containing material. The leach rate improved from 0.0285 mg/cm$^2$/hr to 0.3056 mg/cm$^2$/hr, an increase of more than 10 times. During the Experiment, all of the palladium foil was dissolved, indicating that the corrosion rate and leach rate may have been greater than those measured.

In Experiment 6, 10 mM $FeCl_2$ was added to the leaching solution of Experiment 2 and the palladium-containing material was exposed to the leaching solution at a temperature of about 21° C. The addition of $FeCl_2$ to the leaching solution significantly improved the leaching rate of palladium from the palladium-containing material. The leach rate improved form 0.0285 mg/cm$^2$/hr to 0.3056 mg/cm$^2$/hr, an increase of more than 6 times, even when the temperature of the leaching solution was lowered to about room temperature. Accordingly, the leaching solution of Experiment 6 was able to leach palladium at a temperature of about 21° C.

In Experiment 5 and Experiment 6, the leaching solution changed color from a faint yellow, yellow-brown color to a bright yellow color, indicating that the ferrous ions were oxidized to ferric ions in the presence of the hydrogen peroxide.

In Experiment 7, the leaching solution included 2 M HCl and 10 mM $FeCl_3$ and was substantially free of hydrogen peroxide. The palladium did not exhibit significant weight loss, indicating that without the hydrogen peroxide, the leaching solution was ineffective at leaching palladium from the palladium-containing material and indicating a synergistic effect between the hydrochloric acid, ferric chloride, and hydrogen peroxide.

In Experiment 8, the palladium-containing material was exposed to a leaching solution including less hydrogen peroxide than the leaching solution of Experiment 5 and Experiment 6. The leaching solution included 2 M HCl, about 1.6 weight percent $H_2O_2$, 10 mM $FeCl_2$. The leaching solution was at a temperature of about 66° C. The palladium leach rate was significant, indicating that a leaching solution including lower than about 5 weight percent hydrogen peroxide still effectively leaches palladium from the palladium-containing material, however, the leach rate was lower than that observed in Experiment 5 and Experiment 6.

In Experiment 9, the effect of potassium bromide was studied. The leaching solution included 2 M HCl, about 1.6 weight percent $H_2O_2$, 10 mM $FeCl_2$ and 10 mm KBr. The addition of potassium bromide to the leaching solution reduced the leach rate of the leaching solution compared to that observed in Experiment 5 and Experiment 6.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A method of selectively recovering palladium from a palladium-containing material, the method comprising:
    providing a leaching solution comprising hydrochloric acid, hydrogen peroxide, and an iron salt comprising one or both of ferric chloride or ferrous chloride;
    contacting a palladium-containing material with the leaching solution to dissolve palladium from the palladium-containing material; and
    contacting the dissolved palladium with one or more of zinc, aluminum, or tin to precipitate palladium from the leaching solution.

2. The method of claim 1, wherein providing a leaching solution comprises providing a leaching solution having a ratio of iron ions to hydrogen peroxide within a range from about 1.0:50.0 to about 1.0:250.

3. The method of claim 1, wherein providing a leaching solution comprises providing a leaching solution comprising the iron salt within a range from about 1.0 mM to about 20.0 mM.

4. The method of claim 1, wherein providing a leaching solution comprises providing a leaching solution comprising:
    between about 0.01 M and about 10.0 M hydrochloric acid;
    between about 0.1 weight percent to about 30.0 weight percent hydrogen peroxide; and
    between about 1.0 mM and about 20.0 mM of the iron salt.

5. The method of claim 1, wherein contacting a palladium-containing material with the leaching solution comprises contacting a catalytic converter with the leaching solution.

6. The method of claim 1, wherein providing a leaching solution comprises providing a leaching solution comprising about 1.0 part ferric ions for between about 100 and about 200 parts hydrochloric acid.

7. The method of claim 1, wherein providing a leaching solution comprises providing a leaching solution comprising ferric ions within a range of from about 5.0 mM to about 50 mM for every about 1.0 M of hydrochloric acid.

8. The method of claim 1, wherein providing a leaching solution comprises providing a leaching solution comprising from about 50.0 to about 250 parts by weight hydrogen peroxide for every about 1.0 part by weight of ferric ions.

9. The method of claim 1, wherein providing a leaching solution comprises providing a leaching solution at a temperature within a range from about 15° C. to about 80° C.

10. The method of claim 1, wherein providing a leaching solution comprises providing a leaching solution at a temperature within a range from about 18° C. to about 25° C.

11. A method of selectively recovering palladium from a palladium-containing material, the method comprising:
    contacting, at a temperature less than about 25° C., a palladium-containing material with a leaching solution to form a solution comprising dissolved palladium, the leaching solution comprising:
    from about 1.0 M to about 2.0 M hydrochloric acid;

from about 1.0 weight percent to about 10.0 weight percent hydrogen peroxide; and from about 5 mM ferrous chloride to about 10 mM ferrous chloride; and removing the dissolved palladium from the solution comprising dissolved palladium.

12. The method of claim 1, wherein contacting a palladium-containing material with the leaching solution to dissolve palladium from the palladium-containing material comprises dissolving palladium from the palladium-containing material without dissolving platinum from the palladium-containing material.

13. The method of claim 1, wherein providing a leaching solution comprising hydrochloric acid, hydrogen peroxide, and an iron salt comprising one or both of ferric chloride or ferrous chloride comprises providing the leaching solution to a leaching vessel, and further comprising:

contacting the dissolved palladium with one or more of zinc, aluminum, or tin to precipitate palladium from the leaching solution and form a palladium-free solution; and recycling at least a portion of the palladium-free solution to the leaching vessel.

14. A method of selectively recovering palladium from a palladium-containing material, the method comprising:

providing a leaching solution comprising hydrochloric acid, hydrogen peroxide, and an iron salt comprising one or both of ferric chloride or ferrous chloride, the leaching solution comprising less ferric ions by weight than the hydrogen peroxide by weight; and contacting a palladium-containing material with the leaching solution to dissolve palladium from the palladium-containing material.

15. The method of claim 1, wherein providing a leaching solution comprising hydrochloric acid, hydrogen peroxide, and an iron salt comprising one or both of ferric chloride or ferrous chloride comprises providing a leaching solution comprising between about 80 parts and about 90 parts by weight of hydrogen peroxide for every about 1.0 part by weight of one or both of ferric ions or ferrous ions.

* * * * *

UNITED STATES PATENT AND TRADEMARK OFFICE
CERTIFICATE OF CORRECTION

| | | |
|---|---|---|
| PATENT NO. | : 12,012,642 B2 | Page 1 of 1 |
| APPLICATION NO. | : 16/541930 | |
| DATED | : June 18, 2024 | |
| INVENTOR(S) | : Tedd E. Lister and Luis A. Diaz Aldana | |

It is certified that error appears in the above-identified patent and that said Letters Patent is hereby corrected as shown below:

In the Specification

Column 2, Lines 11-12, change "about 25°, 25° C. a palladium-containing" to --about 25° C., a palladium-containing--

Signed and Sealed this
Fourth Day of March, 2025

Coke Morgan Stewart
*Acting Director of the United States Patent and Trademark Office*